US012716280B2

(12) United States Patent
Foster

(10) Patent No.: US 12,716,280 B2
(45) Date of Patent: Aug. 25, 2026

(54) TOUCH LATCH DRAWER ASSEMBLIES WITH UNINTENTIONAL ANTI-UNLATCHING CAPABILITY

(71) Applicant: Textron Aviation Inc., Wichita, KS (US)

(72) Inventor: Brian Foster, Wichita, KS (US)

(73) Assignee: TEXTRON INNOVATIONS INC., Providence, RI (US)

(*) Notice: Subject to any disclaimer, the term of this patent is extended or adjusted under 35 U.S.C. 154(b) by 144 days.

(21) Appl. No.: 18/739,792

(22) Filed: Jun. 11, 2024

(65) Prior Publication Data

US 2025/0376881 A1 Dec. 11, 2025

(51) Int. Cl.
*E05C 19/02* (2006.01)
*A47B 88/40* (2017.01)

(52) U.S. Cl.
CPC ............ *E05C 19/022* (2013.01); *A47B 88/40* (2017.01)

(58) Field of Classification Search
CPC ........ E05C 19/022; A47B 88/40; E05B 65/46
See application file for complete search history.

(56) References Cited

U.S. PATENT DOCUMENTS 3,492,037 A * 1/1970 Hutchinson ........... E05C 19/165 292/251.5
4,792,165 A * 12/1988 Nishimura ............ E05C 19/022 292/DIG. 4
8,310,191 B2 * 11/2012 Schneider ............ A47B 88/453 312/319.1
9,375,083 B2 * 6/2016 Haemmerle ......... A47B 88/463
9,968,193 B1 * 5/2018 Chen .................... A47B 88/477
10,750,863 B2 * 8/2020 Nugent .................. A47B 88/70
10,980,343 B2 * 4/2021 Boeckenstedt ........... E05G 1/04
2009/0039745 A1 * 2/2009 Wong ...................... E05B 65/44 312/333

(Continued)

FOREIGN PATENT DOCUMENTS

EP 1690473 B1 * 5/2016 ........... A47B 88/956
ES 2650248 T3 * 1/2018 ............. A47B 88/75

(Continued)

*Primary Examiner* — Hanh V Tran
(74) *Attorney, Agent, or Firm* — NIXON & VANDERHYE P.C.

(57) ABSTRACT

Touch latch drawer assemblies are provided with anti-unlatching capabilities and include a front panel defining a latch activation gap with a front edge of a drawer frame. An inner drawer is mounted for movements relative to the drawer frame (e.g., by conventional drawer sliders) between open and closed conditions and is operatively associated with the front panel to allow the inner drawer to be moved independently towards and away from the front panel in inboard and outboard directions, respectively. A conventional touch latch may be provided to bridge the activation gap so as to operatively interconnect the front panel and the drawer frame. A stop is engageable with the inner drawer to maintain the latch activation gap between the front panel and the front edge of the drawer frame to thereby prevent the front panel from being moved in the outboard direction by an unintentional inertial outboard force of the inner drawer to thereby in turn prevent the touch latch from being moved unintentionally into the unlatched state thereof.

18 Claims, 14 Drawing Sheets

(56) References Cited

U.S. PATENT DOCUMENTS

| | | | | |
|---|---|---|---|---|
| 2017/0275928 | A1* | 9/2017 | Kozlowski | E05C 17/52 |
| 2023/0295962 | A1* | 9/2023 | Chen | A47B 88/463<br>312/216 |
| 2024/0423366 | A1* | 12/2024 | Klocko | A47B 88/57 |

FOREIGN PATENT DOCUMENTS

| | | | | | |
|---|---|---|---|---|---|
| JP | 2006305350 | A | * | 11/2006 | A47B 88/403 |
| JP | 2008000156 | A | * | 1/2008 | |
| JP | 2012245311 | A | * | 12/2012 | |
| JP | 5574640 | B2 | * | 8/2014 | |
| WO | WO-2011152242 | A1 | * | 12/2011 | A47B 88/40 |

* cited by examiner

TOUCH LATCH DRAWER ASSEMBLIES WITH UNINTENTIONAL ANTI-UNLATCHING CAPABILITY

FIELD

The embodiments disclosed herein relate generally to drawer assemblies provided with touch (push) latches. In preferred forms, the embodiments disclosed herein relate to touch (push) latch drawer assemblies which have anti-unlatching capabilities which prevent unintentional unlatching due to application of inertial (centrifugal) loads applied to the drawer, e.g., which may occur during maneuvering of a vehicle, such as an aircraft.

BACKGROUND

The interior cabin space of certain luxury vehicles, such as executive aircraft, are typically fitted with monuments to fulfil various purposes. By way of example, some executive transport aircraft may be provided with cabinetry associated with an onboard galley to service the cabin occupants with food and beverages. Such onboard cabinetry will usually be provided with cabinet drawers to accommodate and stow various galley necessities, such as the onboard storage of beverage bottles/cans, food items, ice and the like. The cabinet drawers must of course be latched during aircraft operation but capable of being unlatched when desired by aircraft crew and/or passengers to allow the drawer contents to be accessed.

Touch latches (sometimes referenced as "push" latches) are a popular device to employ for cabinet drawers as the exterior surface of the drawers is entirely free of knobs, handles and other contrivances associated with conventional latching mechanisms. As such, the aesthetic visual appearance of the cabinetry which includes cabinet drawers provided with touch latches is greatly enhanced and is therefore a desirable feature for owners/operators of executive transport aircraft.

As is well known, when a force is applied to the exterior front drawer panel provided with a touch latch, the drawer will be pressed inwardly which depresses the touch latch a predetermined dimension against the spring force thereof until the touch latch disengages which then allows the drawer to be fully opened. Similarly, the touch latch can be re-engaged by pushing against the exterior front drawer panel until the touch latch is depressed sufficiently to cause engagement with the drawer front panel.

Due to the normal engagement/disengagement operation of conventional touch latches, the implementation of touch latch drawers for aircraft cabin interiors presents a significant problem. Specifically, during normal flight operations, the aircraft may be maneuvered in such a manner that causes the drawer contents to experience inertial (centrifugal) loads in an outboard direction which are then transferred to the drawer in which such contents are stowed. It can be appreciated therefore, that such outboard directional inertial loads could be sufficiently great to cause the touch lock associated with the drawer to become disengaged, i.e., due to the outboard directional inertial load physically moving the drawer so as to depress the touch lock thereby causing disengagement. The unintentional disengagement of the touch lock is highly undesirable as the drawer could then become fully opened when the inertial load is removed during further aircraft maneuvering without knowledge of the aircraft crew and/or passengers causing damage to the drawer itself and/or other aircraft interior components.

It would therefore be desirable if touch latch drawer assemblies could be provided with an anti-unlatching capability which prevents the unintentional disengagement of the touch lock due to outboard directional inertial forces that may be applied to the drawer. It is towards providing solutions to such a problem that the embodiments disclosed herein are directed.

SUMMARY

The embodiments disclosed herein are broadly concerned with touch latch drawer assemblies having anti-unlatching capabilities. According to certain embodiments, the touch latch drawer assembly will include a front panel defining a latch activation gap with a front edge of a drawer frame. An inner drawer is mounted for movements relative to the drawer frame (e.g., by conventional drawer sliders) between open and closed conditions and is operatively associated with the front panel to allow the inner drawer to be moved independently towards and away from the front panel in inboard and outboard directions, respectively. A conventional touch latch may be provided to bridge the activation gap so as to operatively interconnect the front panel and the drawer frame to thereby retain the inner drawer in the closed condition when in a latched state thereof and allow the inner drawer to be moved into the open condition when in an unlatched state thereof (i.e., when an intentional manual force is applied to the front panel in the outboard direction). A stop is engageable with the inner drawer to maintain the latch activation gap between the front panel and the front edge of the drawer frame to thereby prevent the front panel from being moved in the outboard direction by an unintentional inertial outboard force of the inner drawer to thereby in turn prevent the touch latch from being moved into the unlatched state thereof.

Some embodiments are provided with an outer drawer having a front wall fixed to a rear surface of the front panel with the inner drawer being nested within and unconnected to the outer drawer in such a manner to allow for independent sliding movements of the outer and inner drawers relative to one another. A front wall of the inner drawer may therefore define an operational gap with the front wall of the outer drawer when a rear wall of the inner drawer is in contact with the stop. The stop may include a stop block fixed to the drawer frame with an inboard facing surface thereof in contact with the rear wall of the inner drawer. According to some embodiments, the rear wall of the outer drawer may define an accommodation space which is sized and configured to allow the stop block to extend therethrough. According to other embodiments, the stop block may include an L-shaped angle piece fixed to a lower wall of the drawer frame, and a compressible block fixed to the angle piece so as to be engageable with the rear wall of the inner drawer.

A fastener system may be provided in accordance with certain embodiments to operatively connect the inner drawer to the front panel and thereby allow for the independent movement of the inner drawer relative to the front panel. The fastener system may include an eyelet defining a through hole in the front wall of the inner drawer, a blind nut embedded within the front panel and a threaded fastener having a proximal head and a threaded shank extending though the through hole of the eyelet. The distal end of the threaded shank is thereby threadably engaged with the blind nut such that the proximal head of the threaded shank defines an operational gap with the front wall of the inner drawer. In such a manner, therefore, the inner drawer is capable of being moved independently towards and away from the front panel in inboard and outboard directions, respectively.

The front drawer panel may include an inner front panel defining a window opening therein that is sized and configured to receive the front wall of the inner drawer to allow the front wall of the inner drawer to be nested within the inner front panel. If present, the latch activation gap is preferably defined between the front edge of the drawer frame and the inner front panel with the touch latch bridging the latch activation gap.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
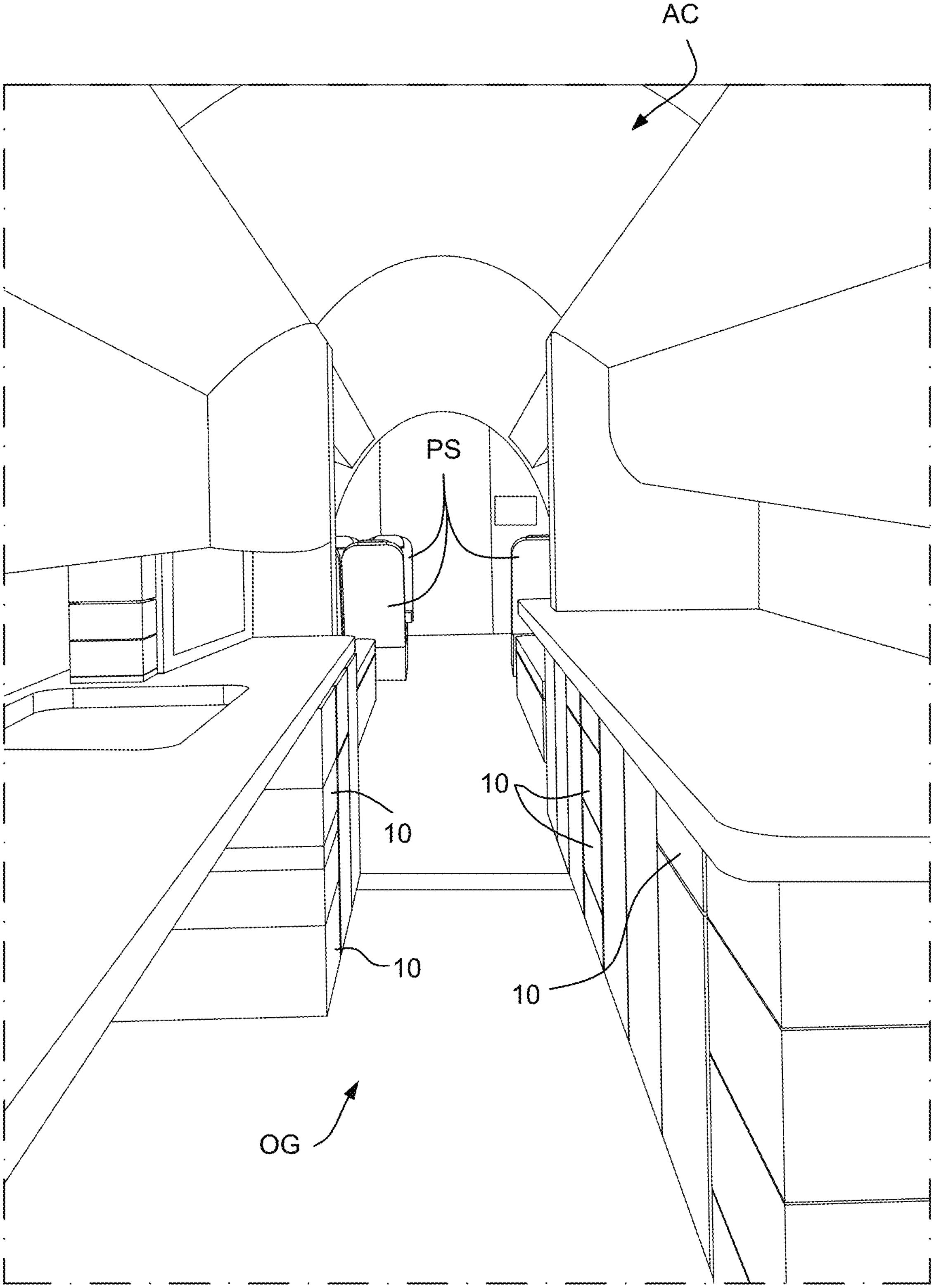
FIG. 1 is a perspective view of an exemplary executive aircraft interior cabin looking aft showing a representative number of touch latch drawers in accordance with the embodiments of the invention as disclosed herein.
Figure 2:
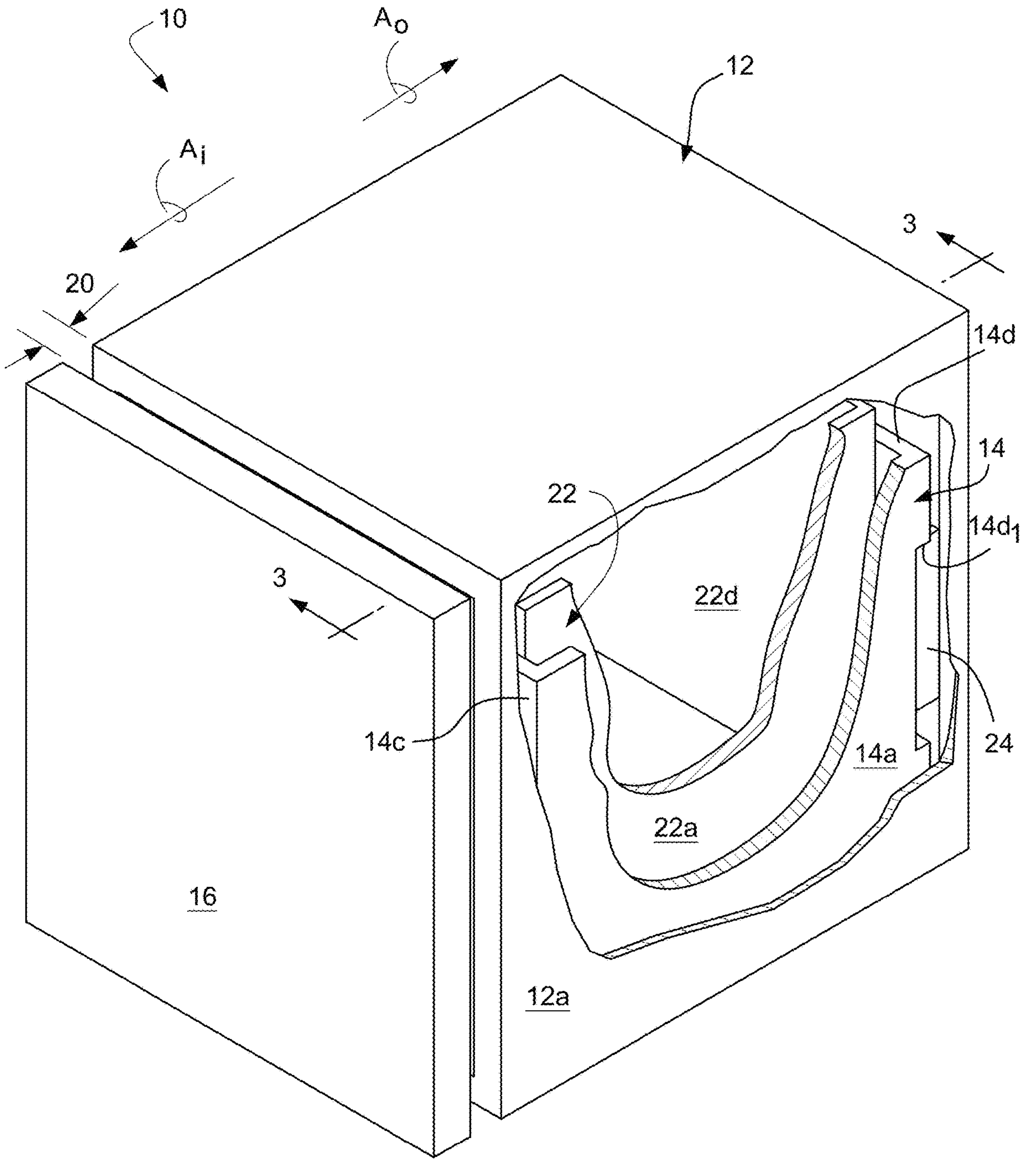
FIG. 2 is a front perspective view of a partially sectioned touch latch drawer assembly in accordance with an embodiment of this invention.

Accompanying FIG. 1 depicts an exemplary aircraft interior cabin AC having a number of passenger seats PS configured as may be desired by the owner/operator and an onboard galley OG which is adapted to allow service of food and/or beverages during flight. The onboard galley OG may thus be provided with a number of touch latch drawer assemblies (a representative few of which are identified by reference numeral 10) in accordance with an embodiment of the present invention.

An exemplary touch latch drawer assembly 10 that may be provided in the onboard galley OG is shown in FIGS. 2-6. As depicted therein, the drawer assembly 10 is generally comprised a drawer frame 12 to which an outer drawer 14 is mounted for movement in reciprocal inboard and outboard directions (arrows Ai and Ao, respectively) by conventional drawer sliders 15 (see FIG. 6). The drawer sliders 15 laterally interconnect the opposed outer drawer sidewalls **14*a*, 14*b* to respectively adjacent walls 12*a*, 12*b* of the drawer frame 12 to thereby allow the outer drawer 14 to be pulled in an inboard direction (arrow Ai) thereby opening the drawer to allow access to the drawer contents DC (see FIGS. 3-6). The front wall 14*c* of the outer drawer 14 is fixed to a decorative front drawer panel 16** which is formed of the cabinetry material visible to the aircraft occupants.

A conventional touch latch 18 is mounted to the drawer frame 12 so as to be engageable with an upper portion of the front drawer panel 16. As is well known, touch latches include a catch device (either mechanical or magnetic) that may be secured to the inside portion of the frame 12 which is adapted to engagingly cooperate with a corresponding latch element affixed to the inside surface of the front drawer panel 16. When the drawer assembly 10 is in a closed condition, the touch latch mechanisms ensure that the drawer 14 remains closed. Opening of the drawer 14 is accomplished by exerting a touch (push) pressure against the front drawer panel 16 in an outboard direction (arrow Ao) which causes the touch latch mechanism to release and allow the front drawer panel 16 to be pulled outwardly in an inboard direction (arrow Ai). Some touch latches may include a ratchet/spring assembly which is disengaged when the latch is pushed in an outboard direction (arrow Ao) so as to load the internal spring when then unloads when the pushing force is released to assist in opening of the drawer in an inboard direction (arrow Ai). Some conventional touch latches that may be employed in the practice of this invention include those described in U.S. Pat. Nos. 3,492,037 and 4,792,165 (the entire contents of each being expressly incorporated hereinto by reference).

The touch latch 18 is mounted to the drawer frame 12 so that a latch activation gap 20 is defined between the rear surface of the front drawer panel 16 and the corresponding opposed front edge of the drawer frame 12. The activation gap 20 should be sufficiently dimensioned so as to be somewhat larger than the travel movement of the touch latch 18 necessary to ensure activation thereby allowing engagement/disengagement thereof. Important to the embodiment of the drawer assembly 10, an inner drawer 22 formed of opposed lateral walls **22*a*, 22*b* and opposed front and rear walls 22*c*, 22*d*, respectively, is nested within and unconnected to the outer drawer 14. As such, the inner drawer 22 rests within the outer drawer 14 so that it may slidably move towards and away from the front and rear walls 14*c*, 14*d*, respectively, and hence the front drawer panel 16 to which the front wall 14*c*** is fixed.

A rigid rear stop block 24 is attached to a rear wall 12*d* of the drawer frame 12 and protrudes into a correspondingly configured accommodation space 14*d*1 formed in the rear wall 14*d* of the outer drawer 14. As can be seen especially in FIGS. 3 and 4, the inboard facing surface 24*a* of the stop block 24 is in substantial coplanar alignment with the inner surface of the rear wall 14*d* of the outer drawer 14 so that both the inner surface of the rear wall 14*d* and the inboard facing surface 24*a* of the stop block 24 may be spaced from or in contact with the outer surface of the rear wall 22*d* of the inner drawer 22 depending on the positioning of the inner drawer 22 within the outer drawer 14. To open the drawer, however, the inner surface of the rear wall 14*d* can be rearwardly spaced from the outer surface of the inner drawer 22 when such outer surface is in contact with the inboard facing surface 24*a* of the stop 24 (see FIG. 5). The inner drawer 22 is also sized so that the front wall 22*c* defines an operational gap 30 with the inner surface of the front wall 14*c* of the outer drawer 14 when the outer surface of the inner drawer 22 is in contact with the inboard facing surface 24*a* of the stop block 24 (see FIG. 4). The dimension of the operational gap 30 is preferably at least equal to (or even somewhat larger than) the dimension of the activation gap 20.

Figure 3:
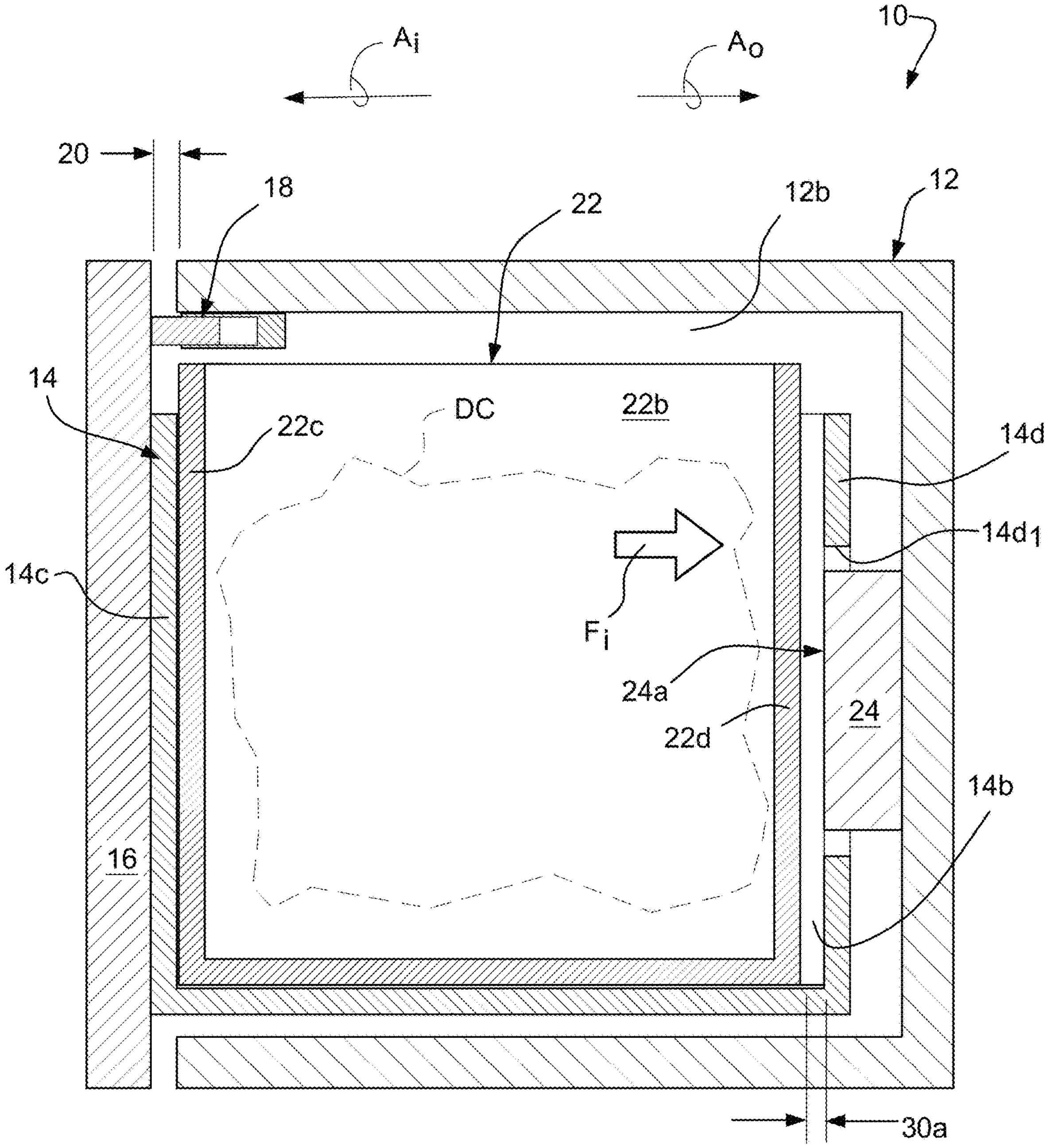
FIG. 3 is a sectional view of the embodiment of the touch latch drawer assembly shown in FIG. 2 as taken along lines 3-3 therein.

As briefly noted above, the inner drawer 22 nested within the outer drawer 14 may in use be loaded with desired drawer contents DC (e.g., bottles, cans, ice and the like) which add weight to the inner drawer 22. When in a closed state, the outer surface of the rear wall 22*d* of the inner drawer 22 may be spaced from the inboard facing surface 24*a* of the stop block 24 by the same dimension as the operational gap 30. Such a state is shown in FIG. 3.

Figure 4:
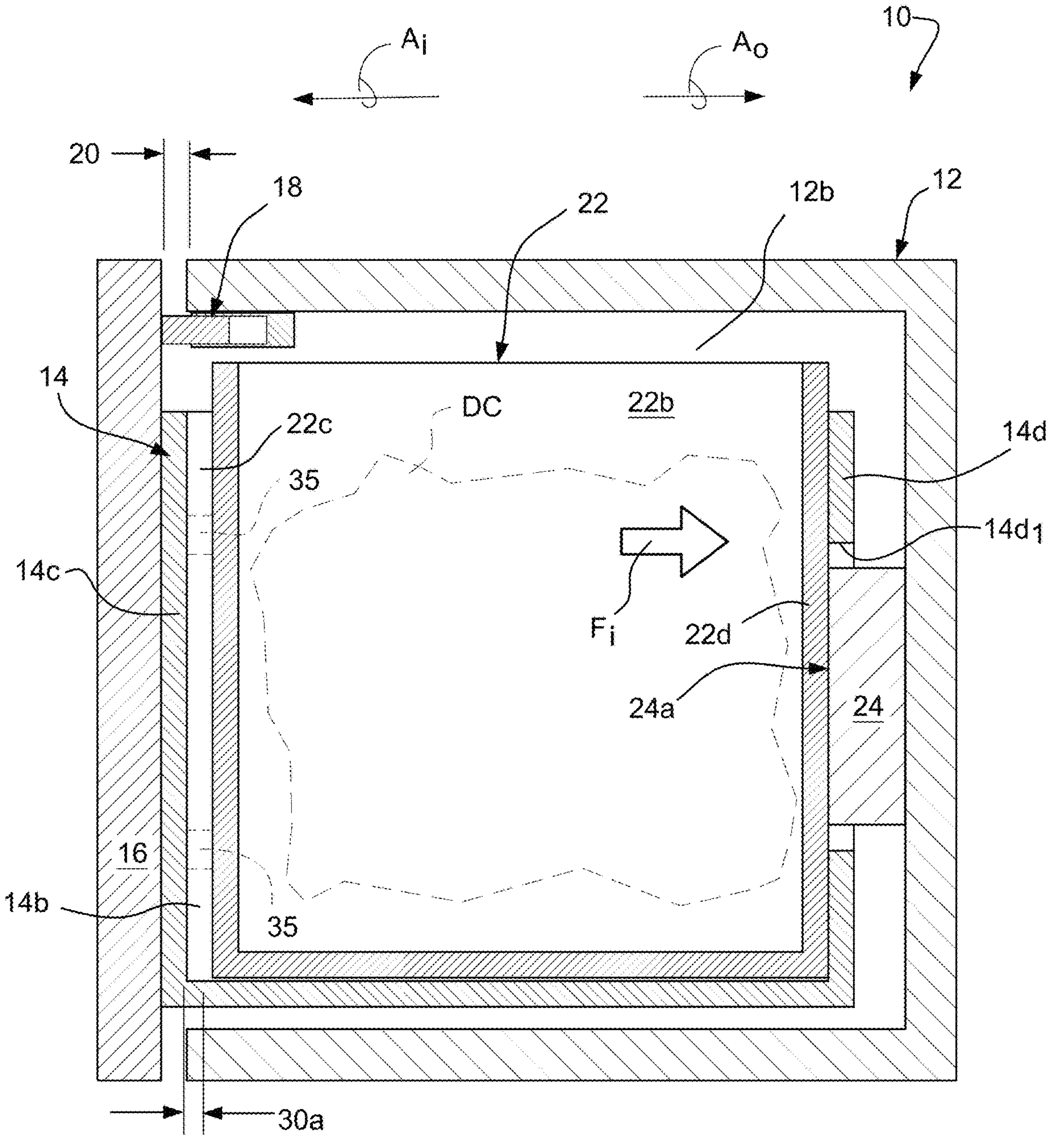
FIG. 4 is a sectional view similar to FIG. 3 but showing the state of the inner drawer following the application of a directionally outboard inertial force to the drawer contents.

In the event that an inertial force Fi of sufficient magnitude is applied to the drawer contents DC in an outboard direction (arrow Ao) which may occur during normal aircraft in-flight maneuvers, the weight of the drawer contents DC will cause the inner drawer 22 to slide in the outboard direction relative to the outer drawer 14 until such sliding movement is arrested by contact with the drawer stop block 24. Such a state is shown in FIG. 4. It will be appreciated that the stop block 24 in turn prevents the inner drawer 22 from pushing the rear wall 14*d* of the outer drawer 14 in an outboard direction. In such a manner therefore, movement of the outer drawer 14 in the outboard direction is prevented which in turn prevents the activation gap 20 from closing, i.e., by simultaneously preventing movement in the outboard direction of the front drawer panel 16 to which the front wall 14*c* of the outer drawer 14 is attached. As such, unintentional disengagement of the touch latch 18 is prevented.

Figure 5:
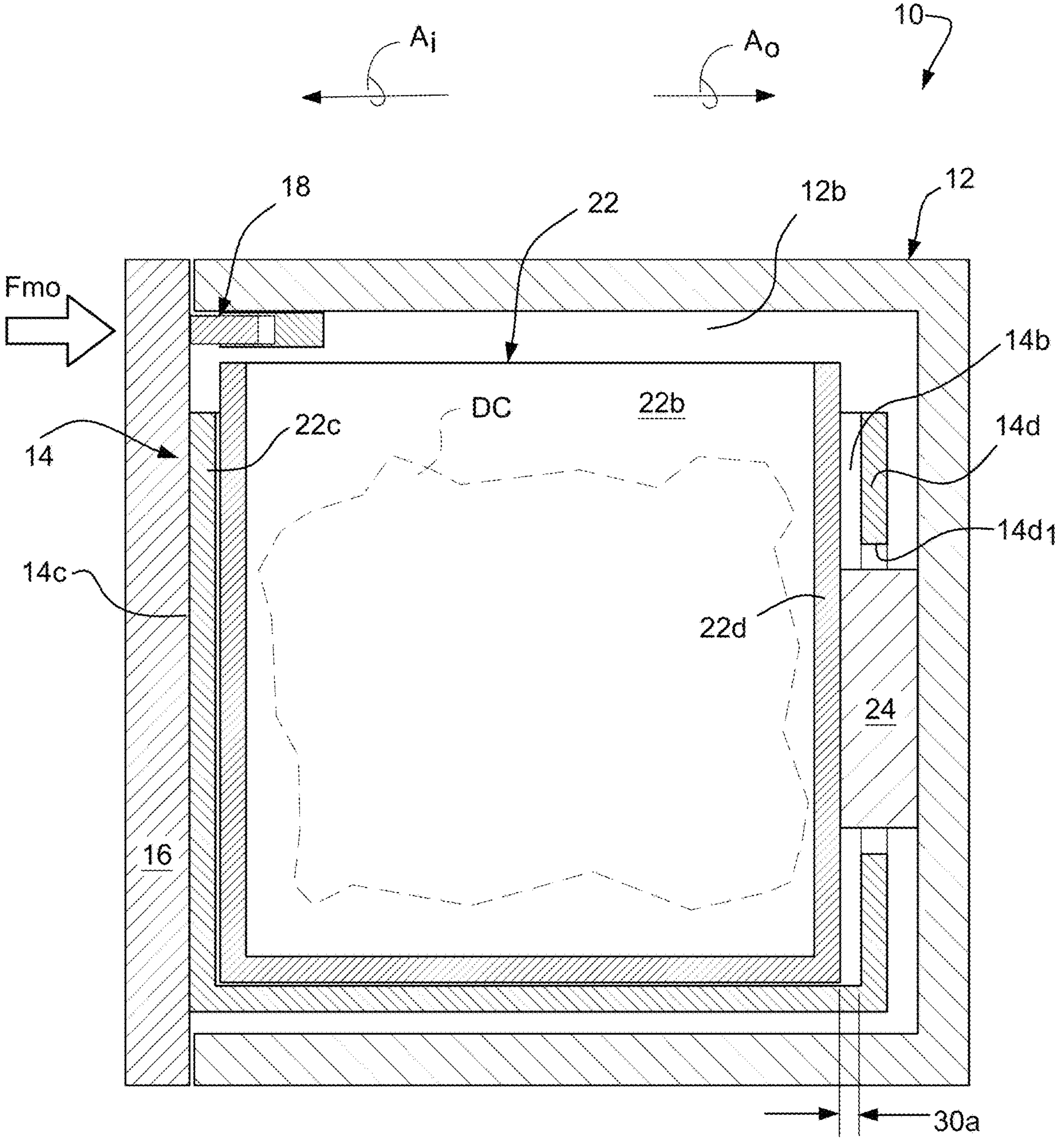
FIG. 5 is a sectional view similar to FIG. 3 but showing the state of the outer drawer following application of a directionally outboard force against the front drawer panel when it is desired to intentionally disengage the touch latch.

When it is desired to intentionally open the drawer assembly 10, a manual force $F_{mo}$ in the outboard direction (arrow Ao) is applied against the upper portion of the front drawer panel 16 as shown in FIG. 5. Such applied manual force $F_{mo}$ will therefore responsively cause the front drawer panel 16 to move the inner drawer 14 in the outboard direction (arrow Ao). However, since the inner drawer 22 is in contact with the drawer stop block 24, the inner drawer 22 is prevented from being moved in the outboard direction with the outer drawer 14 and thereby remains stationary. As such, the outer drawer 14 is allowed to slide relative to the now stationary inner drawer 22. Such sliding movement of the outer drawer 14 relative to the inner drawer 22 is facilitated by the activation gap 20 and the operational gap 30 which are dimensionally reduced until the touch latch 18 is activated causing disengagement with the front panel 16.

Figure 6:
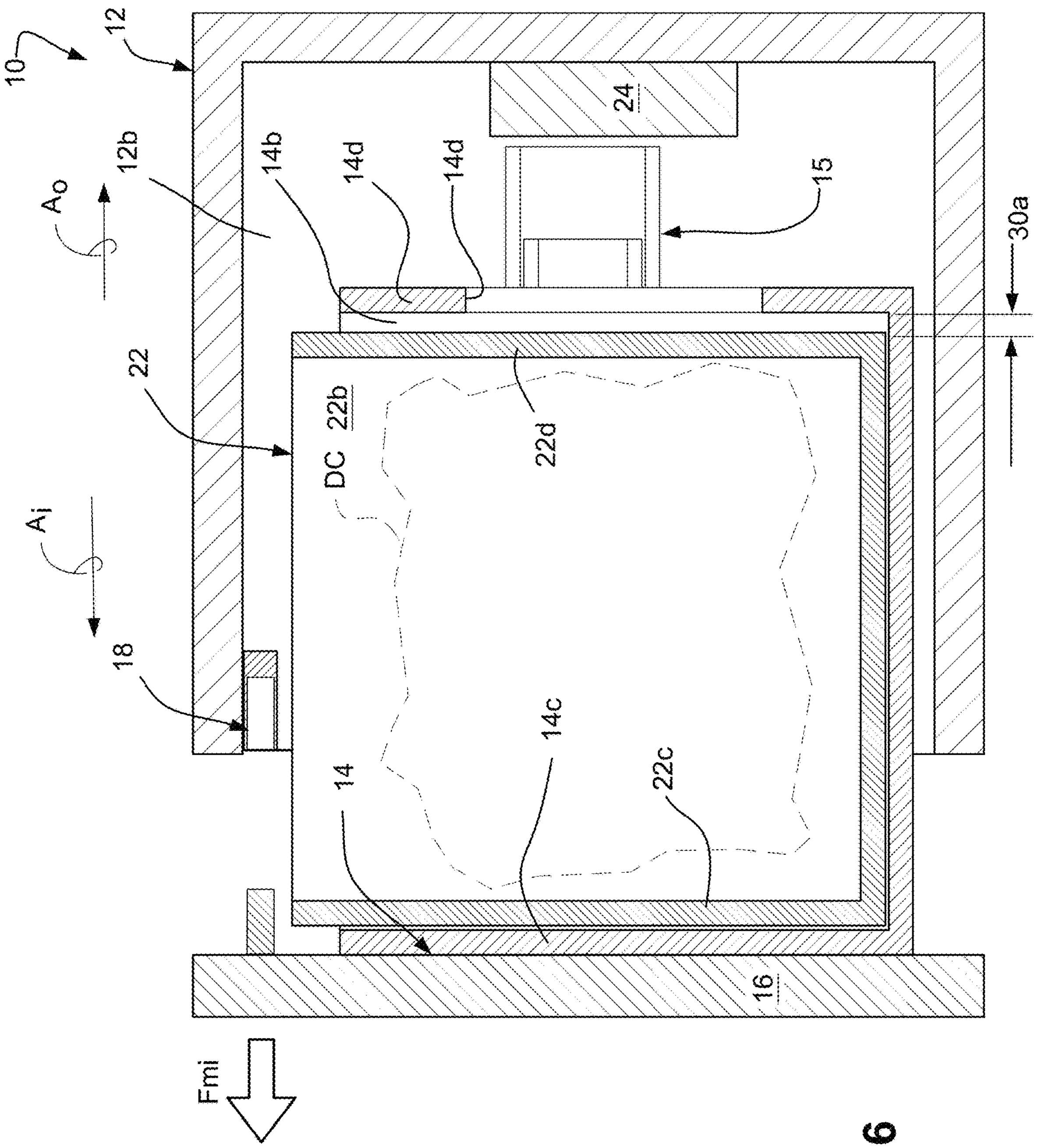
FIG. 6 is a sectional view similar to FIG. 3 but showing the touch latch in a disengaged state and the outer and inner drawers being opened in an inboard direction.
Figure 7:
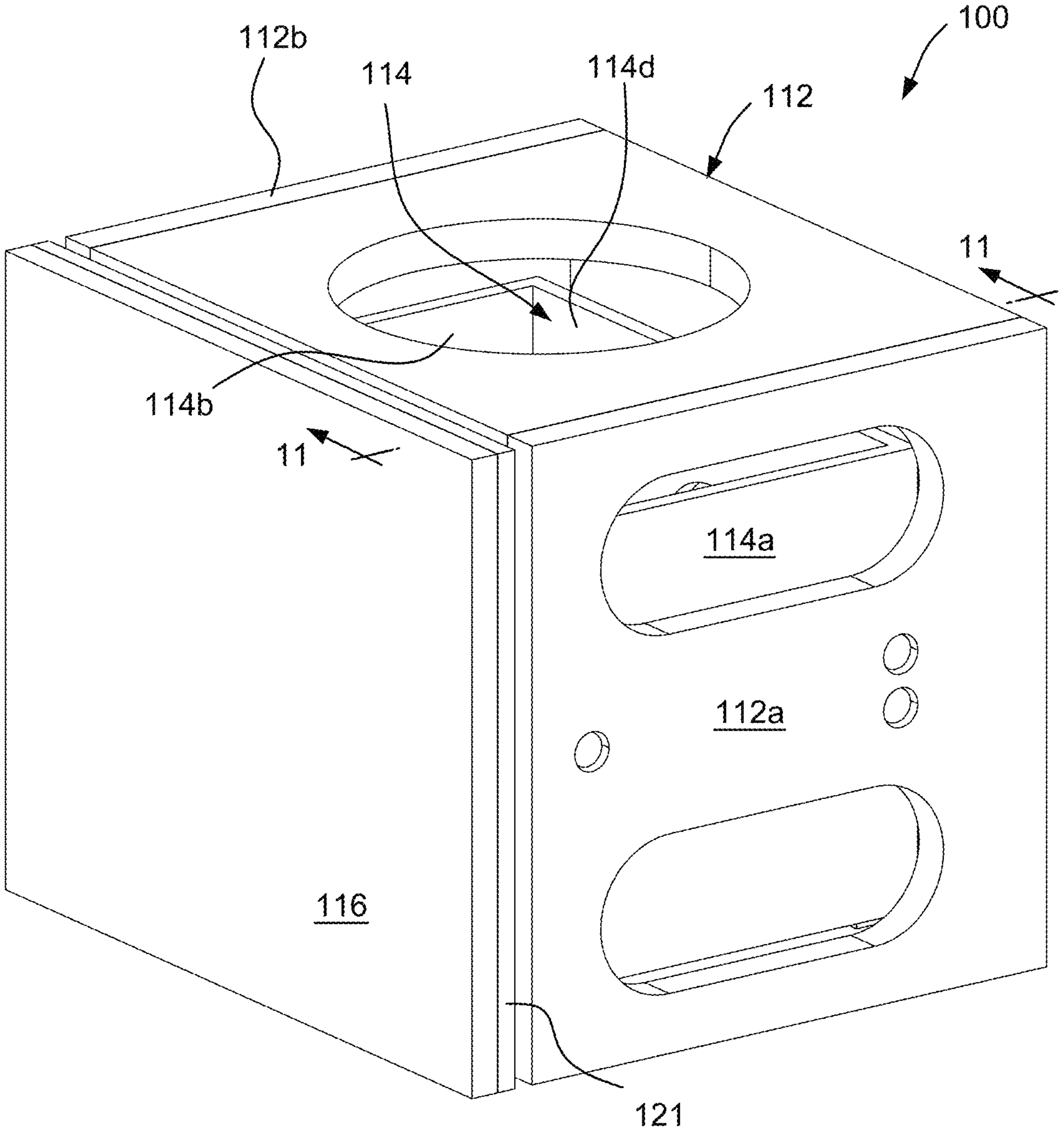
FIG. 7 is a front perspective view of a touch latch drawer assembly in accordance with another embodiment of this invention.
Figure 8:
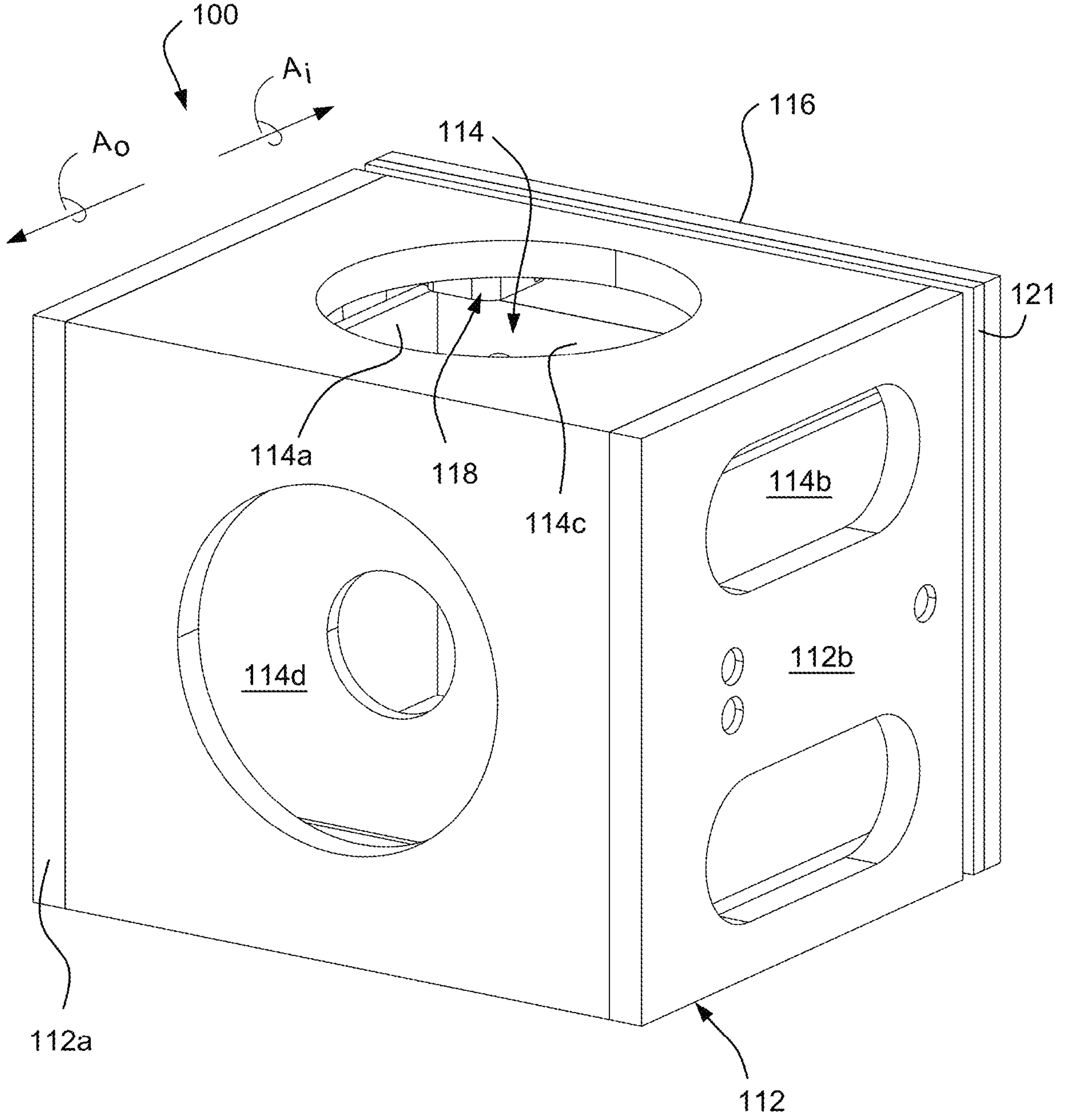
FIG. 8 is a rear perspective view of the touch latch drawer assembly embodiment shown in FIG. 7.
Figure 9:
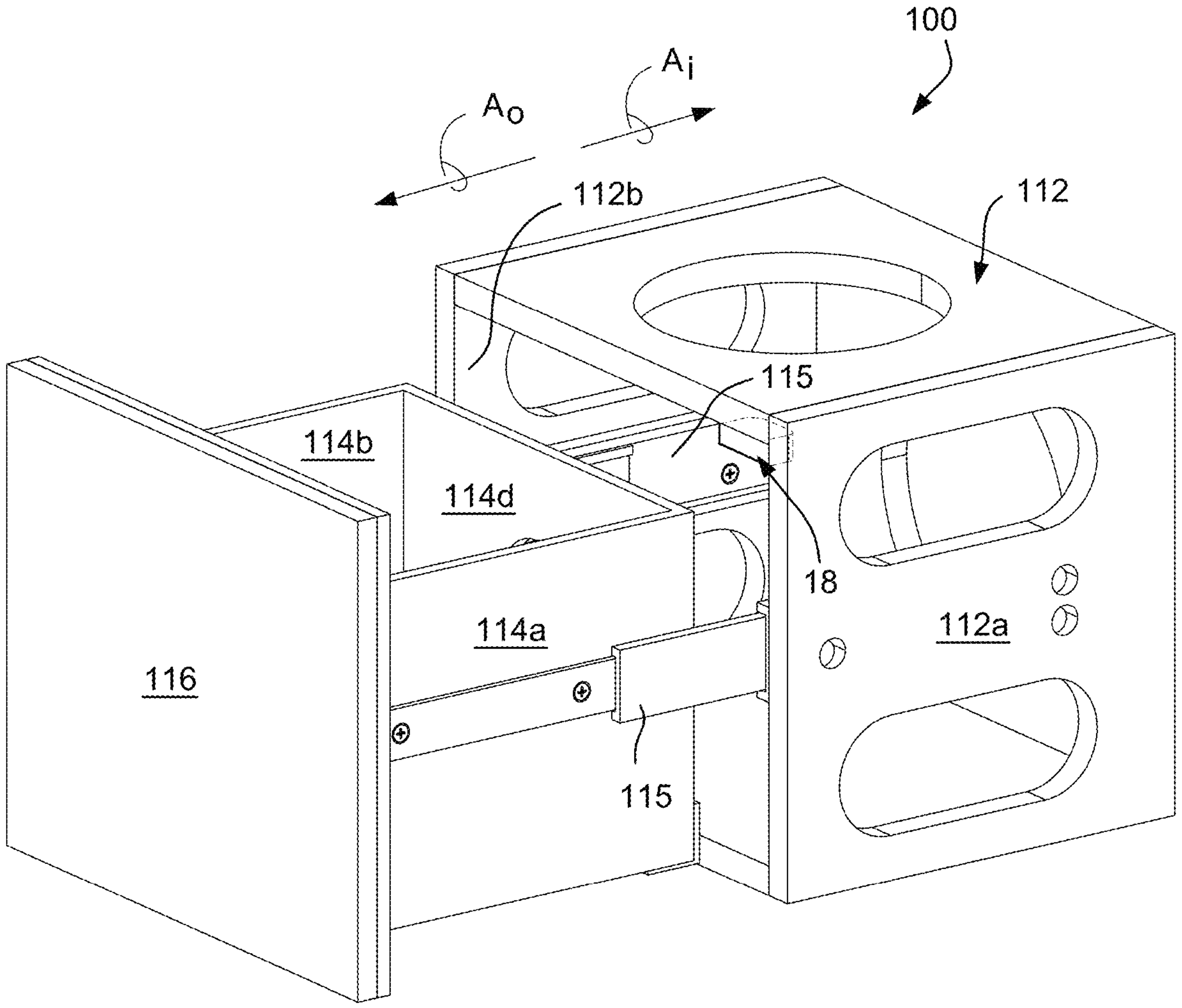
FIG. 9 is a front perspective view showing the inner drawer of the touch latch drawer assembly embodiment of FIG. 7 in an opened state.
Figure 10:
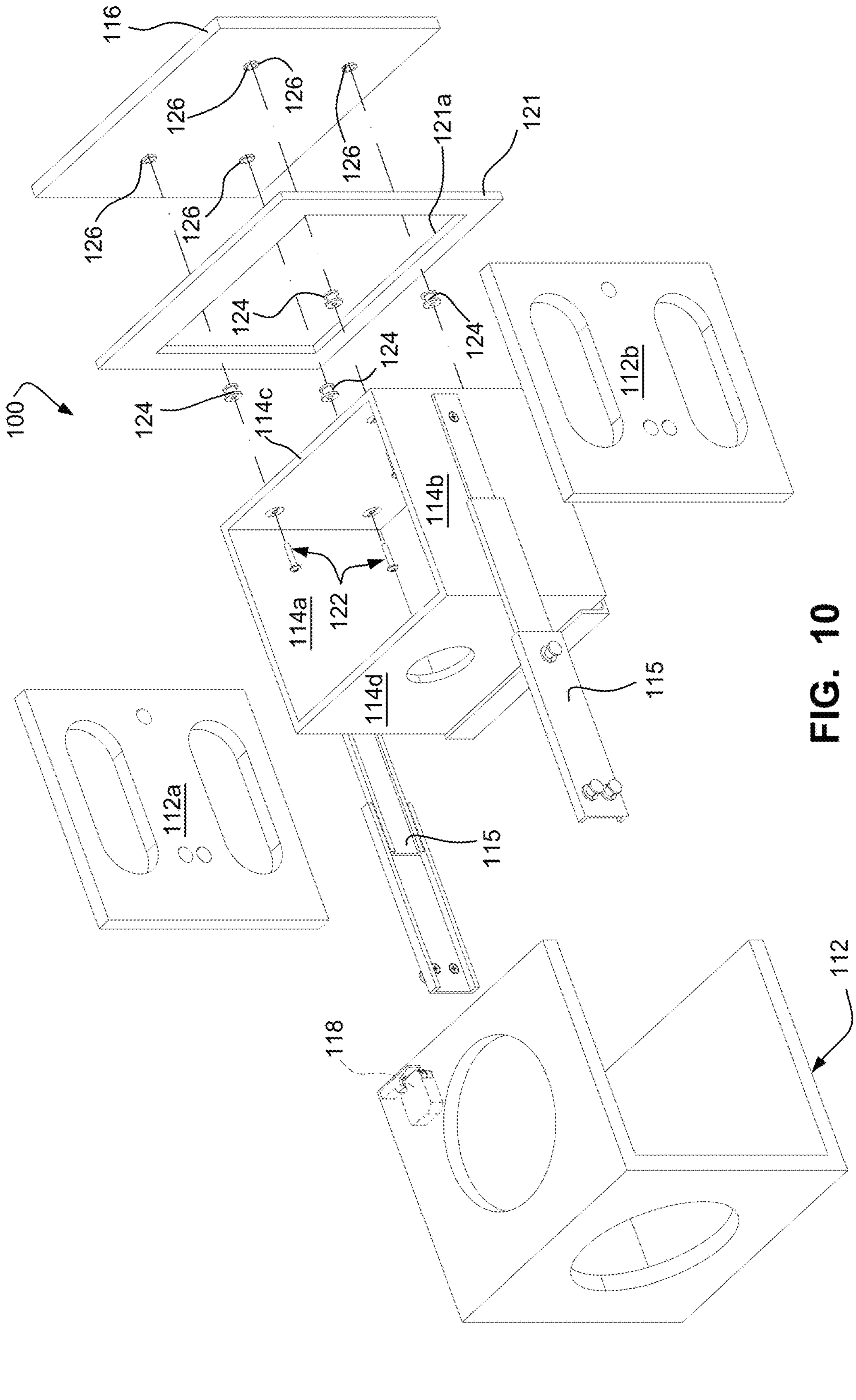
FIG. 10 is an exploded rear perspective view of the touch latch drawer assembly embodiment shown in FIG. 7.

It will be observed that when in such an activated state as shown in FIG. 5, a rear drawer gap 30*a* is then formed between the inner surface of the rear wall 14*d* of the outer drawer 14 and the outer surface of the rear wall 22*d* of the inner drawer 22. Thereafter, the outer drawer 14 with the inner drawer 22 nested therewithin may be pulled away from the drawer frame 12 by a manual force $F_{mi}$ in an inboard direction (arrow Ai) to expose the outer and inner drawers 14, 22, respectively. When in such an opened state as shown by FIG. 6, the drawer contents DC of the inner drawer 22 may be accessed or the entire inner drawer 22 may be removed from its nested relationship with the outer drawer 14. Upon closing the drawer assembly 10, the touch latch 18 will again be activated to latch with the inner and outer drawers 14, 22, respectively, again assuming the positional relationship as shown in FIG. 3.

One or more biasing elements 35 (e.g., compression springs, leaf springs, compressible foam and the like) depicted schematically in FIG. 4 may optionally be attached to the front wall 14*c* of the outer drawer 14. Such biasing elements 35 could therefore be provided so as to assist in positionally maintaining the inner drawer 22 within the outer drawer 14. The biasing elements 35 could also serve to resist inertial loads being applied in an outboard direction (arrow Ao) to the inner drawer 22 while permitting the gap 30 to be dimensionally reduced when it is desired to open the drawer assembly 10.

Another embodiment of a drawer assembly 100 is shown in FIGS. 7-14 that may be employed in the onboard galley OG shown in FIG. 1 instead of or in addition to the drawer assembly 10 as discussed above. As shown, the drawer assembly 100, like the drawer assembly 10 discussed previously, also includes a drawer frame 112 to which an inner drawer 114 having opposed sidewalls 114*a*, 114*b* and opposed front and rear walls 114*c*, 114*d*. The inner drawer 114 is mounted for movement in reciprocal inboard and outboard directions (arrows Ai and Ao, respectively) by conventional drawer sliders 115. As shown, the drawer sliders 115 laterally interconnect the opposed drawer sidewalls 114*a*, 114*b* to respectively adjacent walls 112*a*, 112*b* of the drawer frame 112 to thereby allow the inner drawer 114 to be pulled in an inboard direction (arrow Ai) thereby opening the inner drawer 114 to allow access to the drawer contents.

The front wall 114*c* of the inner drawer 114 is nested within a conformably shaped window opening 121*a* defined in an inner front panel 121 so that the inner front panel 121 is coplanar with and perimetrically surrounds the front wall 114*c*. The inner front panel 121 is immovably fixed and correspondingly sized with respect to the decorative front drawer panel 116. In such a manner, therefore, the front wall 114*c* of the inner drawer 114 may be moved towards and away from the front drawer panel 116 so as to be capable of being respectively moved into and out of the window opening 121*a* of the inner front panel 121.

A conventional touch latch 118 similar to the touch latch 18 described previously is mounted to the drawer frame 112 so as to be engageable with an upper portion of the inner front panel 121. The touch latch 118 is mounted to the drawer frame 112 so that a latch activation gap 120 is defined between the rear surface of the inner front panel 121 and the corresponding opposed front edge of the drawer frame 112. The activation gap 120 should be sufficiently dimensioned so as to be somewhat larger than the travel movement of the touch latch 118 necessary to ensure activation thereby allowing engagement/disengagement thereof.

Figure 11:
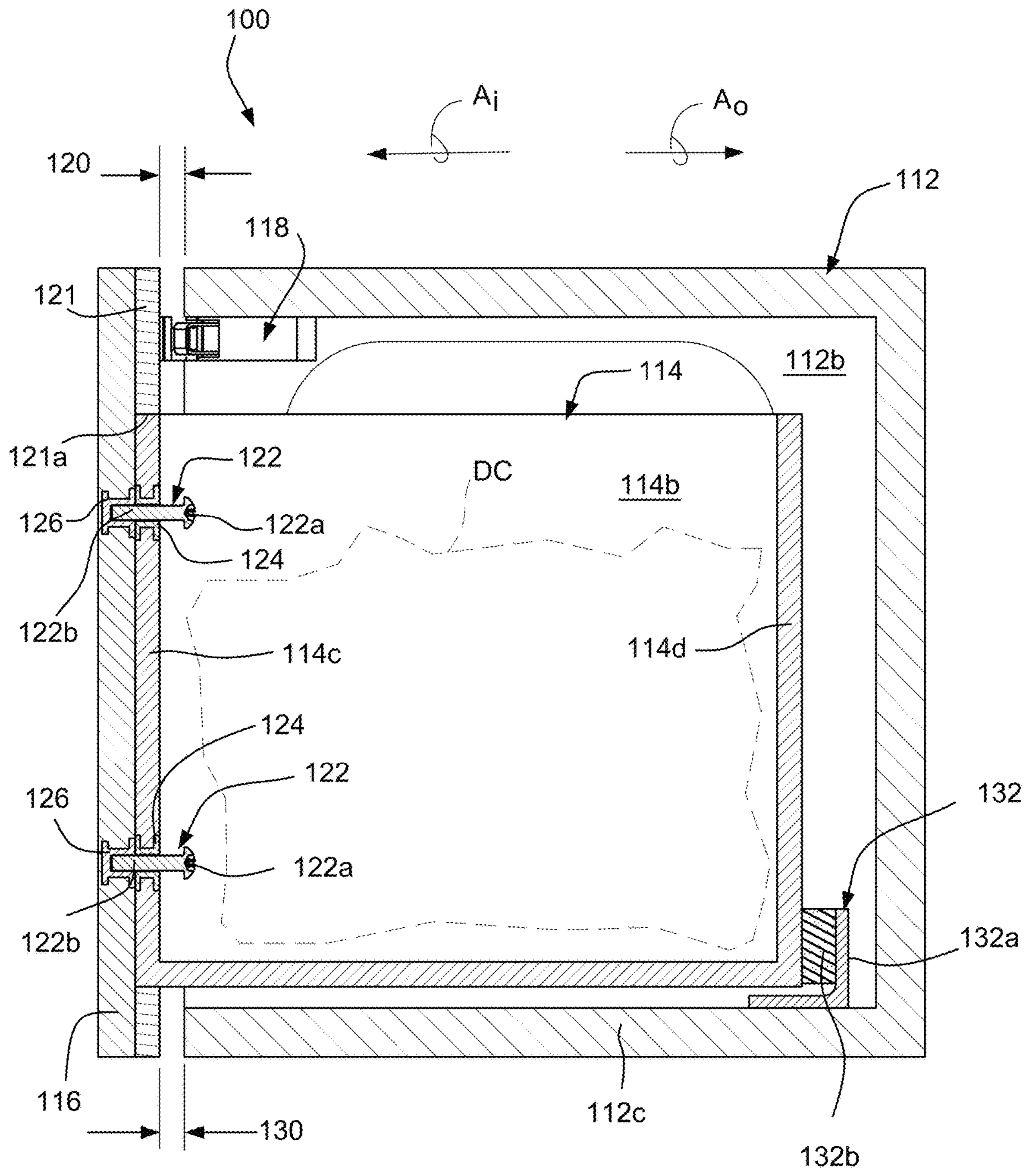
FIG. 11 is a sectional view of the touch latch drawer assembly embodiment shown in FIG. 7 as taken along lines 11-11 therein.
Figure 12:
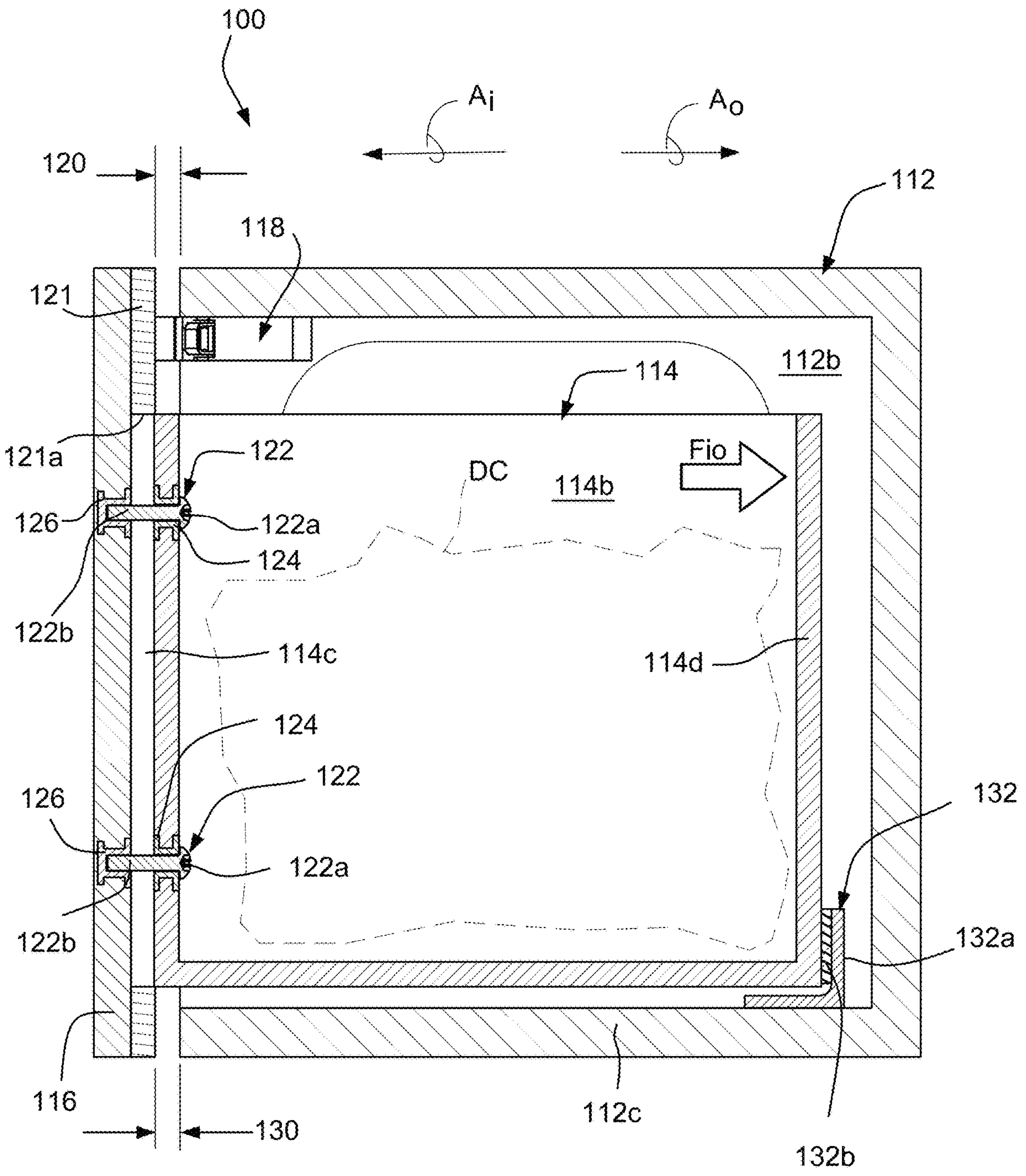
FIG. 12 is a sectional view similar to FIG. 11 but showing the state of the inner drawer following the application of a directionally outboard inertial load to the drawer contents.

The front wall 114*c* of the inner drawer 114 is operatively associated with the front drawer panel 116 by a series of fasteners 122 each of which includes a head 122*a* and a threaded shank 122*b*. The threaded shanks 122*b* extend through corresponding through holes defined by the eyelets 124 positioned in the front wall 114*c* of the inner drawer 114. The distal ends of the threaded shanks 122*b* are threadably connected to a respective blind insert nut 126 embedded in the rear surface of the front drawer panel 116. The blind insert nuts 126 are thus not visible to the aircraft occupants. Important to the embodiment of the drawer assembly 100, when the inner drawer 114 is in a normal closed state as shown in FIG. 11, the rear surface of the front wall 114*c* thereof is flush with the rear surface of the inner front panel 121 and defines an operational gap 130 which is at least equal to (or even somewhat larger than) the dimension of the activation gap 120.

A rear stop member 132 is provided having an elongate L-shaped angle piece 132*a* fixed to the lower wall 112*c* of the frame 112 behind the rear wall 114*d* of the inner drawer 114. A resiliently compressible block 132*b* formed, e.g., of a foam material, is attached to the L-shaped angle piece 132*a*. When the inner drawer 114 is in a normal closed state as shown in FIG. 11, the compressible block 132*b* is in a slightly compressed condition which, due to the resilient nature of the compressible block 132*b*, causes a slight bias force to be applied against the inner drawer 114 in an inboard direction (arrow Ai). Should an inertial force Fio of sufficient magnitude be applied to the inner drawer 114 in an outboard direction (arrow Ao), the inner drawer 114 is allowed to move slightly in the outboard direction relative to the front drawer panel 116 due to the nested relationship between the front wall 114*c* and the window 121*a* formed in the inner front panel 121 and the gap 130 defined between the rear surface of the front wall 114*c* of the inner drawer 114 and the fastener heads 122*a*. Such slight outboard movement of the inner drawer 114 will however be arrested by the rear stop member 132 to prevent the gap 120 from closing. Thus, the fixed position of the L-shaped angle member 132*a* and the compressible block 132*b* thereof will contact the rear wall 114*d* causing the compressible block 132*b* to be maximally compressed thereby preventing movement of the inner drawer 114 in an outboard direction to an extent that would cause activation of the touch latch 118 and the unintentional disengagement of the drawer from its latched state.

Figure 13:
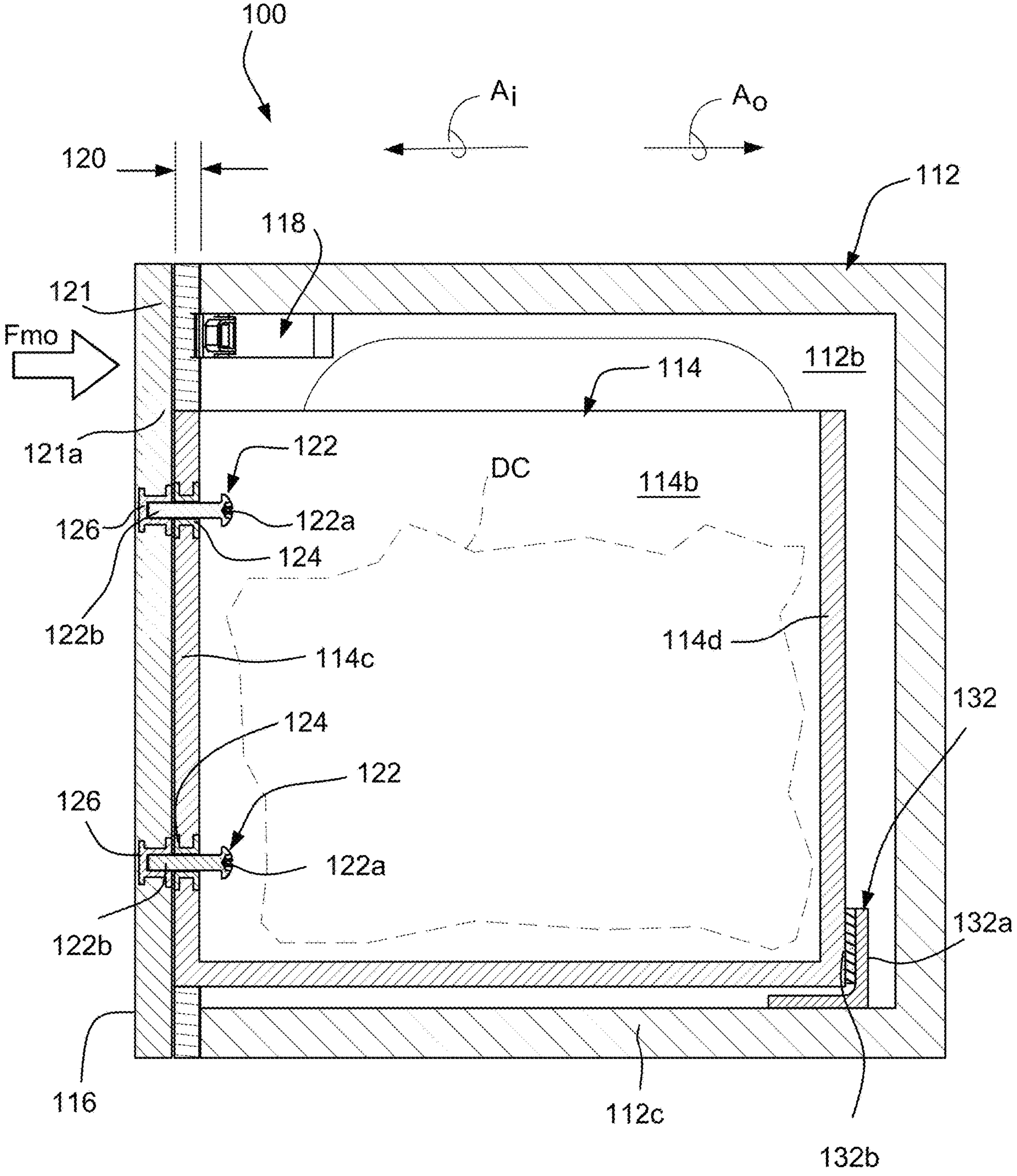
FIG. 13 is a sectional view similar to FIG. 11 but showing the state of the inner drawer following application of a directionally outboard force against the front drawer panel.
Figure 14:
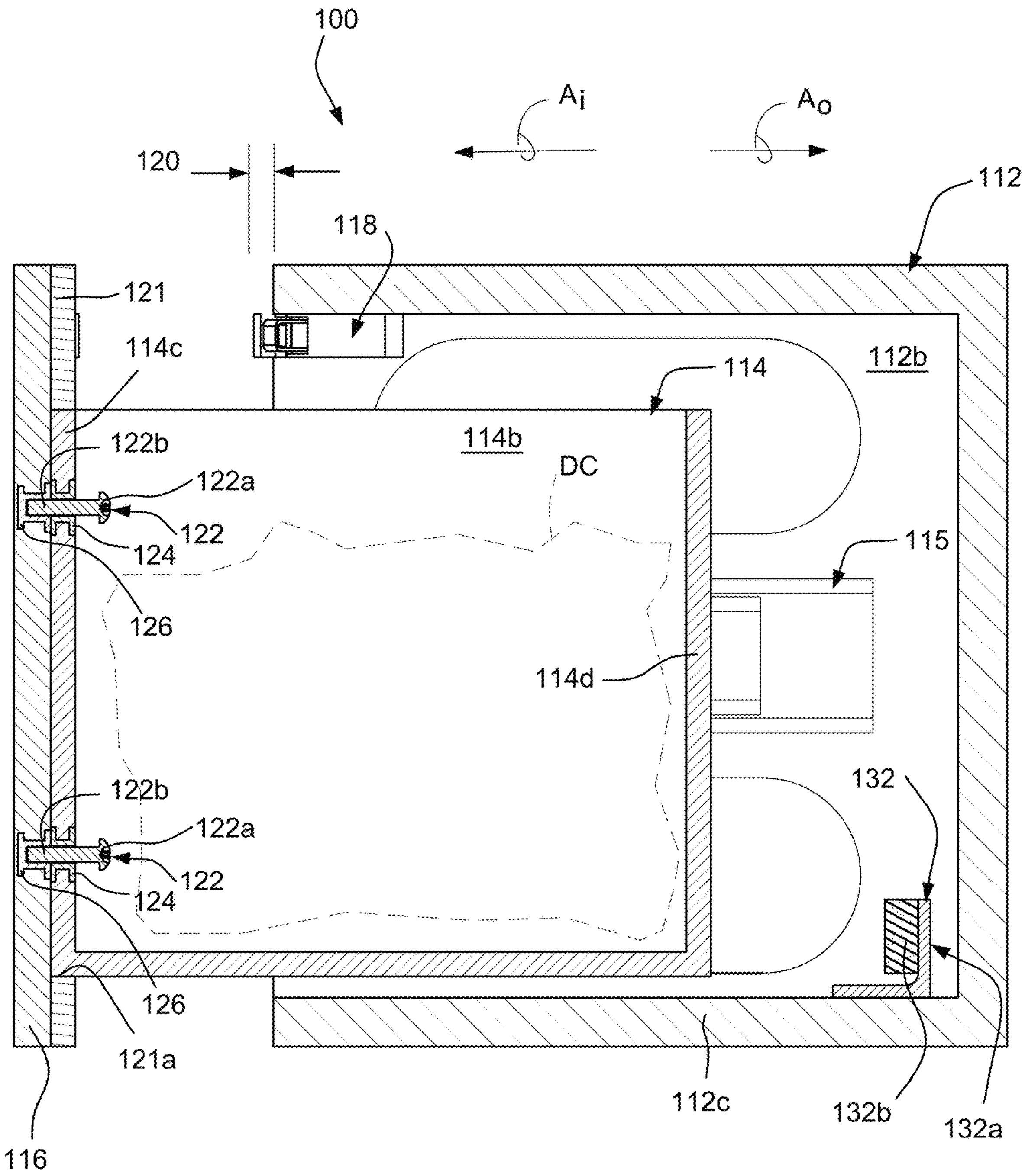
FIG. 14 is a sectional view similar to FIG. 11 but showing the touch latch in a disengaged state to allow the inner drawer to be opened in an inboard direction.

The inner drawer 114 may be opened normally by the application of a manual outboard force $F_{mo}$ against the upper portion of the decorative front drawer panel 116 causing the inner front panel 121 and the inner drawer 114 to collectively move in an outboard direction (arrow Ao) against the bias force provided by the compressible block 132*b* (see FIG. 13). Sufficient outboard directional movement of the inner drawer 114 and the inner front panel 121 will thereby dimensionally reduce the activation gap 120 to an extent that the touch latch 118 is activated which in turn disengages the inner front panel and the front drawer panel 116 to allow the drawer to be opened. Such a state is shown in FIG. 14.

Those skilled in this art will recognize that modifications may be made without departing from the functional purpose of the embodiments disclosed herein. For example, the compressible block 132*b* could optionally also include or be substituted by virtually any spring-type element (e.g., compression or leaf spring elements) which function to exert a bias force against the rear wall 114*b* of the inner drawer 114 in an inboard direction (arrow Ai).

Therefore, while reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A touch latch drawer assembly having unintentional anti-unlatching capability comprising:

a drawer frame defining a front edge;

a front panel defining a latch activation gap with the front edge of the drawer frame;

an inner drawer mounted for movements relative to the drawer frame between open and closed conditions and being operatively associated with the front panel to allow the inner drawer to be moved independently towards and away from the front panel in inboard and outboard directions, respectively;

a touch latch bridging the activation gap so as to operatively interconnect the front panel and the drawer frame to retain the inner drawer in the closed condition when in a latched state thereof and allow the inner drawer to be moved into the open condition when in an unlatched state thereof in response to a manual force applied to the front panel in the outboard direction which closes the latch activation gap; and a stop engageable with the inner drawer to maintain the latch activation gap between the front panel and the front edge of the drawer frame to thereby prevent the front panel from being moved in the outboard direction by an inertial outboard force of the inner drawer to thereby in turn prevent the touch latch from being moved unintentionally into the unlatched state thereof.

2. The touch latch drawer assembly according to claim 1, which further comprises:

an outer drawer having a front wall fixed to a rear surface of the front panel, wherein the inner drawer is nested within the outer drawer to allow for independent sliding movements of the outer and inner drawers relative to one another.

3. The touch latch drawer assembly according to claim 2, wherein a front wall of the inner drawer defines an operational gap with the front wall of the outer drawer when a rear wall of the inner drawer is in contact with the stop.

4. The touch latch drawer assembly according to claim 3, wherein the stop includes a stop block fixed to the drawer frame and includes an inboard facing surface in contact with the rear wall of the inner drawer.

5. The touch latch drawer assembly according to claim 4, wherein a rear wall of the outer drawer defines an accommodation space which is sized and configured to allow the stop block to extend therethrough.

6. The touch latch drawer assembly according to claim 2, further comprising lateral drawer sliders connecting respective side walls of the outer drawer to adjacent side walls of the drawer frame.

7. The touch latch drawer assembly according to claim 3, further comprising at least one spring element positioned in the operational gap between the front walls of the inner and outer drawers.

8. The touch latch drawer assembly according to claim 1, wherein the stop includes a stop block fixed to a rear wall of the drawer frame and includes an inboard facing surface in contact with a rear wall of the inner drawer.

9. The touch latch drawer assembly according to claim 8, further comprising at least one compression element operably exerting a bias force against the inner drawer to maintain the rear wall of the inner drawer in contact with the inboard facing surface of the stop block.

10. The touch latch drawer assembly according to claim 1, wherein the stop comprises:

an L-shaped angle piece fixed to a lower wall of the drawer frame, and a compressible block fixed to the angle piece so as to be engageable with the rear wall of the inner drawer.

11. The touch latch drawer assembly according to claim 1, further comprising a fastener system to operatively connect the inner drawer to the front panel to allow for the independent movement of the inner drawer relative to the front panel.

12. The touch latch drawer assembly according to claim 11, wherein the fastener system comprises:

an eyelet defining a through hole in the front wall of the inner drawer;

a blind nut embedded within the front panel; and a threaded fastener having a proximal head and a threaded shank extending though the through hole of the eyelet, wherein a distal end of the threaded shank is threadably engaged with the blind nut and the head at a proximal end of the threaded shank defines an operational gap with the front wall of the inner drawer to allow the inner drawer to be moved independently towards and away from the front panel in inboard and outboard directions, respectively.

13. The touch latch drawer assembly according to claim 12, wherein the front drawer panel includes an inner front panel defining a window opening therein that is sized and configured to receive the front wall of the inner drawer to allow the front wall of the inner drawer to be nested within the inner front panel.

14. The touch latch drawer assembly according to claim 13, wherein the latch activation gap is defined between the front edge of the drawer frame and the inner front panel.

15. The touch latch drawer assembly according to claim 14, wherein the touch latch bridges the latch activation gap defined between the front edge of the drawer frame and the inner front panel.

16. The touch latch drawer assembly according to claim 12, wherein the stop comprises:

an L-shaped angle piece fixed to a lower wall of the drawer frame, and a compressible block fixed to the angle piece so as to be engageable with the rear wall of the inner drawer.

17. The touch latch drawer assembly according to claim 13, wherein the front wall of the inner drawer is nested within the inner front panel such that the inner front panel is coplanar with and perimetrically surrounds the front wall of the inner drawer.

18. The touch latch drawer assembly according to claim 12, further comprising lateral drawer sliders connecting respective side walls of the inner drawer to adjacent side walls of the drawer frame.

* * * * *